Patented Oct. 5, 1943

2,331,009

UNITED STATES PATENT OFFICE 2,331,009

PROCESS FOR THE MANUFACTURE OF p-p'-DIAMINO-DIPHENYL-SULPHONE AND ITS MONOAMINO DERIVATIVES

Rudolf Tschesche, Berlin-Wilmersdorf, and Kurt Bohle, Berlin-Lichterfelde, Germany, assignors to Schering Corporation, Bloomfield, N. J., a corporation of New Jersey No Drawing. Application October 31, 1938, Serial No. 237,926. In Germany November 1, 1937

6 Claims. (Cl. 260—397.6)

This invention relates to a process for the manufacture of p.p'-diamino-diphenyl-sulphone and its monoamino derivatives.

The p.p'-diamino-diphenyl-sulphone has recently acquired particular importance in therapy owing to its extraordinarily high activity against cocci infections such as are caused by streptococci, pneumococci and so on. This sulphone compound is, however, very difficultly produced. The known processes, for example, the treatment of chloronitrobenzene with sulphur and alkali with subsequent reduction and the manufacture of the p.p'-diphenyl-sulphone-dicarboxylic acid with subsequent acid amide degradation according to Hoffmann, give only very small yields which in general do not exceed 5%.

In accordance with the present invention the p.p'-diamino-diphenyl-sulphone can be obtained in yields of 50% and above when salts of p-aminobenzene-sulphinic acid, in particular its alkali and silver salts, in which the amino group is suitably protected against the action of the reagents used, for instance by acylation, as by acetylation or the like, are brought into reaction with a 1-halogen-4-nitrobenzene, the diphenyl-sulphone obtained reduced to the corresponding amino compound and if required the amino group reformed. As particularly suitable reaction component has proved bromonitrobenzene, which in contradistinction to the corresponding chloro-compound gives essentially better yields and purer products. The reaction is suitably carried out in such a manner that the two components are heated in alcoholic solution under pressure to about 150-170° C. The purification of the reaction product takes place advantageously in such a manner that the unreacted halogen-nitrobenzene is driven off by steam whereupon the sulphone formed in the reaction is precipitated from the aqueous residue and thus separated from the unreacted water-soluble alkali salt of the sulphinic acid.

In order to convert the nitro group of the sulphone formed into the amino group the customary reducing agents are employed in so far as they do not attack the sulphone group. As particularly advantageous has proved the reduction by means of hydrosulphites. Suitably one proceeds in such a manner that the product is dissolved in glacial acetic acid and then treated in the hot with an excess of hydrosulphite solution. There is thereby obtained the acyl compound of the p.p'-diamino-diphenyl-sulphone which can be converted in the customary manner into the diamino compound. The product is distinguished by great purity.

The following examples illustrate the invention:

(a). *Interaction of the sodium salt of p-acetyl-aminobenzene-sulphinic acid with p-choro-nitrobenzene*

40 grams of the sodium salt of p-acetylaminobenzene sulphinic acid are heated with 35 grams of p-chloronitrobenzene and 50 ccs. of methanol for 8-10 hours to 150-170° C. After the reaction mixture is cooled steam is passed in until all the chloronitrobenzene is driven off, whereby the p-acetylamino-p'-nitro-diphenyl-sulphone is precipitated from the aqueous solution and is then filtered with suction. For purification it is boiled for a short time with about 50 ccs. of glacial acetic acid. Thereby a small portion of the p-acetylamino-p'-nitrodiphenyl-sulphone passes into solution, which, however, on cooling is almost completely precipitated again, while some brown decomposition product remains in solution and is thus easily removed. The p-acetylamino-p'-nitro-diphenyl-sulphone is sufficiently pure for further working up; it melts at 220–222° C. The yield amounts to about 20 grams.

(b). *Interaction of the sodium salt of p-acetylamino benzene-sulphinic acid with p-bromonitrobenzene*

40 grams of the sodium salt of p-acetylaminobenzene-sulphinic acid are caused to react with 40 grams of p-bromonitrobenzene and 50 ccs. of methanol in the same manner as above described. The unreacted bromonitrobenzene is distilled off with steam. There are obtained after purification with glacial acetic acid about 40 grams of p-acetylamino-p'-nitro-diphenyl-sulphone. The unreacted bromonitrobenzene can immediately be further employed for a new batch.

*Reduction of the p-acetylamino-p'-nitro-diphenyl-sulphone*

50 grams of p-acetylamino-p'-nitro-diphenyl-sulphone are dissolved in 500 ccs. of glacial acetic acid and the hot solution treated, with stirring, gradually with a solution of 100 grams of sodium hydrosulphite in water. After the addition of the hydrosulphite the reaction mixture is heated for half an hour further on the water bath. Then the solution obtained, notwithstanding any precipitate which may be produced, is evaporated in vacuum. The residue is treated with about 500 ccs. of water to which gradually so much sodium hydroxide solution is added that the solution exhibits alkaline reaction. The monoacetyl-diamino-diphenyl-sulphone remains undissolved and is filtered with suction. For purification it is dissolved in 15% aqueous hydrochloric acid and the solution treated with three times the volume of water. By this means there is precipitated a small quantity of brown by-products in oily form, from which the supernatant solution is separated by filtration or decantation. The solution is now rendered alkaline with sodium hydroxide solution, whereby the p-actylamino-p'-amino-diphenyl-sulphone is precipitated. It is filtered with suction and recrystallised from glacial acetic acid. Yield about 25 grams of M. P. 228–230° C.

By hydrolysis there is obtained from this hitherto unknown product the p.p'-diamino-diphenyl-sulphone. Of course, many changes and variations may be made in the reaction conditions, the components used and the like. Thus, for instance, instead of using the acetyl-group in order to protect the amino group in the amino-benzene-sulphinic acid, also other acyl groups may be employed, such as the propionyl-, benzoyl-, carboalkoxy group or even non-acidic groups, such as the benzyl group and the like. Furthermore, one may start with other substituted benzene-sulphinic acids containing a substituent that can be transformed into an amino group such as the nitro-, azoxy-, hydrazo-, nitroso-benzene-sulphinic acids which are transformed into the corresponding amino acid by reduction, and still others. These changes and variations can be made by any chemist skilled in the art in accordance with the principles set forth herein and in the claims annexed hereto.

Thus, by means of the process of the present invention it is possible in a simple manner and in good yield to produce the hitherto unknown mono-substituted derivatives of the diamino-diphenyl-sulphone which is not directly possible according to the known processes.

What we claim is:

1. Process for the manufacture of p.p'-disubstituted diphenyl-sulphones comprising heating a salt of a p-acylamino-benzene-sulphinic acid with a 1-halogen-4-nitrobenzene to produce a p-acylamino-p'-nitro-diphenyl sulphone, and reducing the product to the corresponding p'-amino compound.

2. Process as claimed in claim 1, in which a salt of p-acetylamino-benzene-sulphinic acid is employed as one of the starting materials.

3. Process for the manufacture of mono-acetylated - p.p' - diamino - diphenyl-sulfones, which comprises reacting p-acetylamino - p' - nitro - diphenyl-sulfone, with an agent capable of reducing a nitro group to an amino group.

4. p-Acetylamino - p' - aminodiphenyl sulfone having the following formula:

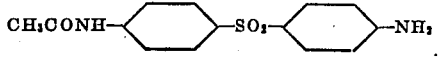

5. Process as claimed in claim 1, in which 1-bromo-4-nitrobenzene is employed.

6. Process as claimed in claim 1, in which the reduction is carried with hydrosulphite in glacial acetic acid solution with heating.

R. TSCHESCHE.
KURT BOHLE.